US005272037A

United States Patent [19]

Ohtani et al.

[11] Patent Number: 5,272,037

[45] Date of Patent: * Dec. 21, 1993

[54] POLYOLEFINIC RESIN-COATED UNEVEN CARRIER

[75] Inventors: Junji Ohtani; Junji Machida; Kazuo Ota, all of Osaka; Satoshi Asahi, Chiba; Hiroshi Hayashi, Tokyo; Kouichi Matono, Chiba, all of Japan

[73] Assignees: Minolta Camera Kabushiki Kaisha, Osaka; Idemitsu Kosan Company Limited, Tokyo, both of Japan

[*] Notice: The portion of the term of this patent subsequent to Mar. 3, 2007 has been disclaimed.

[21] Appl. No.: 726,807

[22] Filed: Jul. 8, 1991

Related U.S. Application Data

[62] Division of Ser. No. 464,152, Jan. 12, 1990, Pat. No. 5,093,201.

[30] Foreign Application Priority Data

Jan. 13, 1989 [JP] Japan .................................. 1-007254
Jan. 13, 1989 [JP] Japan .................................. 1-007255

[51] Int. Cl.[5] ......................... G03G 9/00; G03G 5/00; B32B 5/16

[52] U.S. Cl. .................................... 430/108; 430/137; 428/407

[58] Field of Search ................ 430/108, 137; 427/221; 428/407

[56] References Cited

U.S. PATENT DOCUMENTS

| | | | |
|---|---|---|---|
| 3,607,342 | 9/1971 | Sato . | |
| 4,065,305 | 12/1977 | Jugle | 430/107 |
| 4,564,647 | 1/1986 | Hayashi et al. . | |
| 4,973,541 | 11/1990 | Kohri et al. | 430/108 |
| 5,093201 | 3/1992 | Ohtani et al. | 428/407 |

FOREIGN PATENT DOCUMENTS

| | | |
|---|---|---|
| 52-154639 | 12/1977 | Japan . |
| 54-35735 | 3/1979 | Japan . |

*Primary Examiner*—Marion E. McCamish
*Assistant Examiner*—Stephen C. Crossan
*Attorney, Agent, or Firm*—Burns, Doane, Swecker & Mathis

[57] ABSTRACT

The present invention provides a polyolefinic resin-coated carrier having a rough surface and containing a core material in a quantity of 90 or more % by weight. Said resin-coated layer may contain fine particles having a charge-controlling function and/or electrically conductive fine particles as additives.

7 Claims, 2 Drawing Sheets

POLYOLEFINIC RESIN-COATED UNEVEN CARRIER

This application is a divisional of application Ser. No. 07/464,152, filed Jan. 12, 1990, U.S. Pat. No. 5,093,201.

BACKGROUND OF THE INVENTION

The present invention relates to carriers used in the two-component developing method, in particular carriers coated with polyolefinic resins.

A two-component developing method, in which insulating nonmagnetic toners are mixed with carrier particles to frictionally charge the toners and the developers are carried and brought into contact with a electrostatic latent image to develop the electrostatic latent image, has been known as an electrostatic latent image-developing method.

Particulate carriers used in such the two-component developing method have been usually coated with suitable materials on account of reasons such as the prevention of toners from filming on a surface of carriers, the formation of a surface in which carriers are uniformly distributed, the prevention of a surface oxidation, the prevention of a reduced resistance to humidity, the prolongation of a useful life time of developers, the protection of a photoreceptor from a damage or an abrasion by carriers, the control of a chargeable polarity and the control of a charging quantity.

Polyolefinic resins have been known as such the coating materials (for example Japanese Patent Laid-Open No. Sho-52-154639, Japanese Patent Laid-Open No. Sho 54-35735 and the like).

Japanese Patent Laid-Open No. Sho 52-154639 discloses that polypropylene resins and the like are heated to be molten in suitable solvents and the resulting molten resins are spray-coated to carrier core materials to obtain carriers of which surface is coated with polypropylene resins.

Japanese Patent Laid-Open No. Sho 54-35735 discloses that coating material powders are stuck to a surface of carrier particles and heated at temperatures of a melting point of the coating material or more to be fixed, whereby obtaining coated carriers.

However, the carriers, of which surface is coated with polyolefinic resins in the above described manner, have shown disadvantages in that an adhesion of a coated layer to carriers is poor and a durability is inferior, for example, if the copying process is repeated, the coated material is separated. In addition, the above described methods have shown disadvantages in that for example the control of a film-thickness is not easy.

SUMMARY OF THE INVENTION

It is an object of the present invention to provide polyolefinic resin-coated carriers showing no deteriorated image quality after the repeated copying processes and superior in durability and spent resistance.

The present invention provides polyolefinic resin-coated carriers having an uneven surface and containing a carrier core material in a quantity of 90% or more by weight. And, the present invention relates to polyolefinic resin-coated carriers in which said resin-coated layer may contain fine particles having a charge-controlling function and/or electrically conductive fine particles as additives.

DETAILED DESCRIPTION OF THE INVENTION

The present invention provides carriers which are superior in electrostatic characteristic, spent resistance, charge stability and environmental resistance, effective for the formation of an image of good quality, and capable of keeping those effects even after a long-time continuous usage.

The present invention is achieved by coating said carrier core materials with polyolefinic resins so that the carrier core material-content may be 90% or more by weight and giving an uneven structure to the surface of said coated layer.

And, the object of the present invention can be more effectively achieved by further adding a charge-controlling fine particles and/or electrically conductive fine particles in the polyolefinic resin coated layer as additives.

Figure 1:
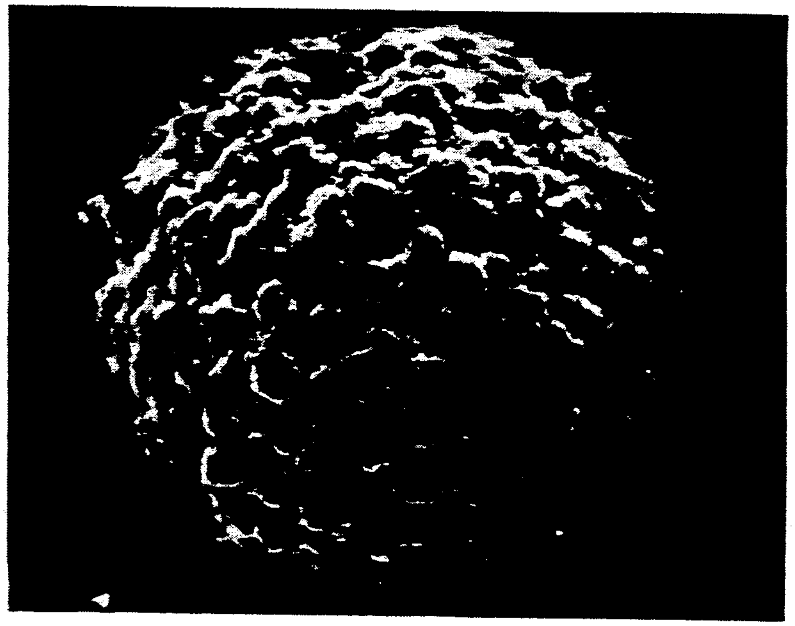
FIG. 1 and FIG. 2 show respectively photographs showing constitutions of carrier particles according to the present invention coated with polyethylene resin-coating layers having uneven structures on surfaces thereof.
Figure 2:
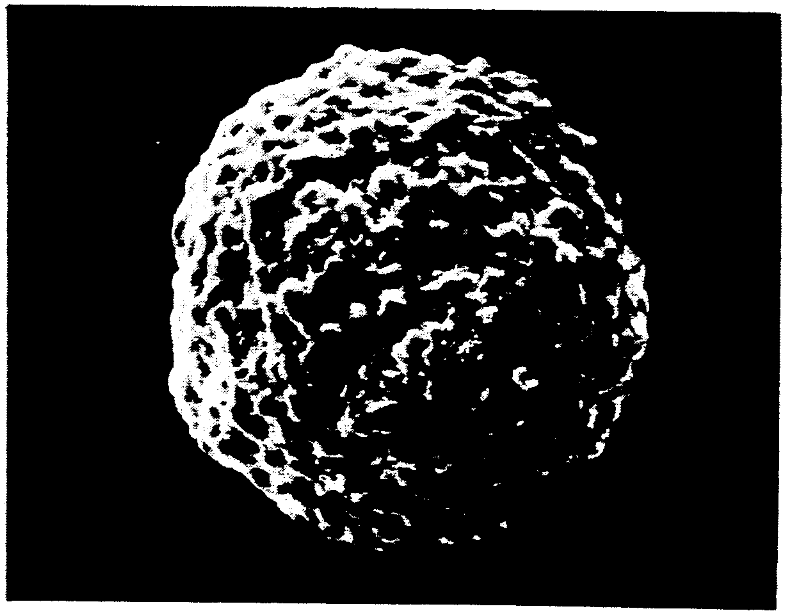
Figure 3:
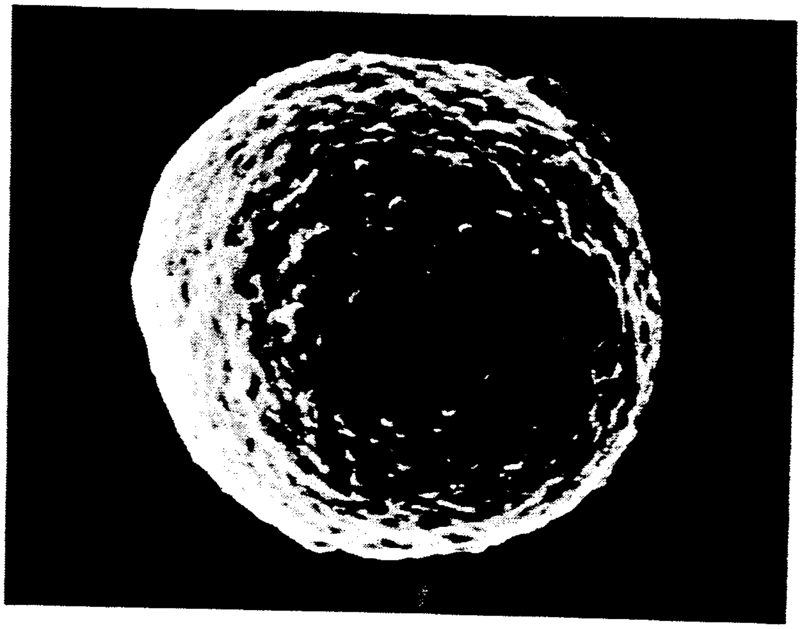
FIG. 3 and FIG. 4 show respectively are photographs showing particulate structures of carriers with polyacrylic resin-coating layers formed thereon by a spray drying method.
Figure 4:
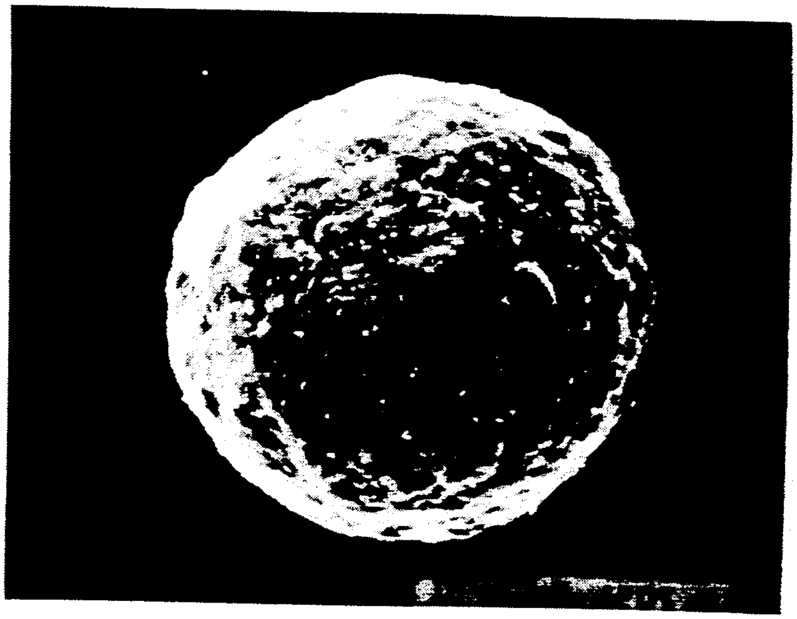

The carriers according to the present invention are coated with polyolefinic resins and characterized in a form of the polyolefinic resin coated layer. For easy understanding, photographs showing structures of carrier particles with polyethylenic resin-coated layers formed thereon according to the present invention are shown in FIG. 1 and FIG. 2. Hereinafter, in this specification, polyolefines are represented by polyethylene and the carriers with the polyethylenic resin coated layer formed thereon are described. FIG. 1 and FIG. 2 are photographs (×1,000) of carriers obtained according to Production Example 1 and Production Example 4 respectively, which will be mentioned later, taken by means of a reflecting electron microscope. It is found that the carrier surface-coating polyethylenic resin layer has irregular convex portions. Carriers having such the convex portions formed of polyethylenic resins on the surface thereof have never been known. For reference, photographs showing structures of carrier particles with thermosetting acrylic resin-coated layers formed thereon by a spray-drying method are shown in FIG. 3 and FIG. 4. FIG. 3 and FIG. 4 show photographs (× 1,500) of carriers obtained according to Comparative Example 1 and Comparative Example 4 respectively, which will be mentioned later, taken by means of a reflecting electron microscope. Even though the photographs shown in FIG. 3 and FIG. 4 were taken in a magnification larger than that of the photograph shown in FIG. 1 or FIG. 2, it is obvious that the surfaces of the carriers shown in FIG. 3 and FIG. 4 are still more smooth, that is, the surface of the carriers shown in FIG. 3 or FIG. 4 is clearly different from that of the carriers shown in FIG. 1 or FIG. 2 in structure. Thermosetting acrylic resin-coated carriers are shown in FIG. 3 and FIG. 4 but a surface structure of carriers coated with polyethylenic resins by a spray drying method, a welding method and the like is similar to that shown in FIG. 3 or FIG. 4 and if such the carriers are repeatedly used as a developer, there arise problems such as the poor durability (separation of the coated layer), the increased quantity of toners spent, the deterioration of an image quality and the like.

It is difficult to directly specify such the convex portion. However, when it is represented by the shape factor S represented by the following formula [I]:

$$S=\{(\text{outside circumference})^2/\text{area}\}\times\{1/(4\pi)\}\times 100 \quad [I]$$

wherein the outside circumference is a mean value of outside circumferences of projected images of the carrier particles and the area is a mean value of projected areas of the carrier particles, its value S is 130 to 200, preferably 140 to 170. The value S represents a degree of an unevenness of the surface of particles. The greater the degree of an unevenness of the surface is, the value further than 100 it shows. If the value S is smaller than 130, naturally the thickness of the coated layer is reduced and the electric resistance is reduced, so that the carrier developing phenomenon occurs. On the contrary, if the value S is larger than 200, the fluidity is spoiled and the coating layer is apt to separate.

In the present invention, the shape factor S is a mean value of values measured by an image analyzer (Louzex 5,000 manufactured by Japan Regulator Co., Ltd.) but it has been observed that in general the measurement of the shape factor is independent upon a kind of image analyzers, so that the image analyzer used for the measurement of the shape factor S is not limited by the above described kind of image analyzer.

The polyethylenic resin-coated carriers having uneven surfaces have an specified range of electric resistance, coating ratio, filling ratio by weight percent, specific gravity and the like depending upon the structures of the carrier core material and the coated layer and the object and the effects of the present invention can be more effectively achieved within such the ranges.

The carrier core material having a mean particle diameter of at least 20 μm in view of the prevention of the adherence (scattering) of the carriers to a supporter of an electrostatic latent image and at most 100 μm in view of the prevention of the deterioration of the image quality, such as the prevention of the generation of carrier lines, is used. Concretely speaking, materials known as electrophotographic two-component carriers, for example metals such as ferrite, magnetite, iron, nickel, cobalt and the like alloys of metals above mentioned with metals such as zinc, antimony, aluminum, lead, tin, bismus, beryllium, manganese, selenium, tungsten, zirconium, vanadium and the like, metal oxides such as iron oxides, titanium oxides, magnesium oxide and the like, nitride, such as chrome nitride, vanadium nitride and the like, and carbides such as silicon carbide, tungsten carbide and the like, ferromagnetic ferrite, and mixtures thereof, can be used.

The core of carrier is coated by polyethylenic resin so that the content of the coated parts of the carrier may be 70% or more, preferably 90% or more, still more preferably 95% or more. If the coating ratio is lower than 70%, characteristics (unstabilized environmental resistance, reduction of electric resistance and unstabilized charging) of the carrier core material itself strongly appear through the ground, so that the advantages of the coating with resins can not be utilized.

A content of the carrier core material based on the carrier (hereinafter referred to as filling ratio by weight percent) is set at about 90 wt % or more, preferably 95 wt % or more. The filling ratio shows indirectly a layer-thickness of a layer coated with resins of the carriers. If the filling ratio is lower than 90 wt %, the coated layer becomes so thick that, for example, the coated layer is separated, the charge amount being increased, the stabilized durability and charging being not satisfied, in view of the image quality, the fine line reproducibility being inferior, and the image concentration being reduced when the carries are actually used as the developer.

The layer-thickness of the layer coated with polyethylenic resins can be indirectly expressed also by a specific gravity. The specific gravity of the carriers according to the present invention is greatly influenced by a kind of carrier core material but it is set at about 3.5 to 7.5, preferably about 4.0 to 6.0, still more preferably about 4.0 to 5.5, so far as said carrier core material is used. If the specific gravity of the carriers is outside of said range, problems similar to those incidental to the carriers, which are not coated at said suitable content, occur.

An electric resistance of the polyethylenic resin-coated carriers with an unevenness on a surface thereof according to the present invention is set at about $1\times10^6$ to $1\times10^{14}$ ohm.cm, preferably about $10^8$ to $10^{13}$ ohm.cm, still more preferably about $10^9$ to $10^{12}$ ohm.cm. If the electric resistance is smaller than $1\times10^6$ ohm.cm, the carriers are developed to deteriorate the image quality. In addition, if the electric resistance exceeds $1\times10^{14}$ ohm.cm, toners are excessively charged, so that the appropriate image concentration can not be obtained. It can be thought also that the electric resistance indirectly expresses said coating amount with polyethylenic resins and the content of charging carrier core materials.

Additives, such as fine particles having a charge controlling function or electrically conductive fine particles, may be added to a carrier coated by polyethylene layer according to the present invention.

Concretely speaking, said fine particles having a charge controlling function include metal oxides, such as $CrO_2$, $Fe_2O_3$, $Fe_3O_4$, $IrO_2$, $MnO_2$, $MoO_2$, $NbO_2$, $PtO_2$, $TiO_2$, $Ti_2O_3$, $Ti_3O_5$, $WO_2$, $V_2O_3$, $Al_2O_3$, $MgO$, $SiO_2$, $ZrO_2$ and $BeO$, dyestuffs such as Nigrosinee Base and Spiron Black TRH and the like.

Said electrically conductive fine particles include carbon blacks such as carbon black, acetylene black and the like, carbides such as SiC, TiC, MoC, ZrC and the like nitrides such as BN, NbN, TiN, ZrN and the like, magnetic powders such as ferrite, magnetite and the like.

The addition of metal oxides, metal fluorides and metal nitrides is effective for the further enhancement of the chargeability. Such the effect seems to be brought about by a synergism of the charging effects of the respective ingredients and the toners resulting from a contact of a complicated boundary surface formed of such the compounds, polyethylene and the core material with the toners.

The addition of carbon black is effective for the enhancement of the development and the obtainment of an image having a high image concentration and a clear contrast. It seems that the addition of the electrically conductive fine particles, such as carbon black, leads to a moderate reduction of electric resistance of the carriers and the well-balanced leak and accumulation of electric charge.

One of characteristics of the conventional binder type carriers consists in the superior reproducibilities of half-tone and gradience but with the coated carriers according to the present invention, the carriers superior in reproducibility of gradience are obtained by adding the magnetic powders to the polyethylenic resin-coated layer. It seems that a surface composition similar to that of the binder type carriers is obtained by adding the magnetic powders to the polyethylene-coated layer, whereby the chargeability and specific gravity approach to those of the binder type carriers.

The addition of borides and metal carbides is effective for the rise of the charging.

The size of the above described additives, the quantity of the additives added and the like are not specially limited so far as various kinds of characteristic of the carriers according to the present invention, such as unevenness, coating ratio and electric resistance described in the specification of the present invention, are satisfied. But, in relation to a method of producing carriers according to the present invention, which will be mentioned later, the size of the fine particles to such an extent that for example they are uniformly dispersed in dehydrated hexane to be turned into a slurry without cohering is sufficient. Concretely speaking, a mean particle diameter of 2 to 0.01 μm, preferably 1 to 0.01 μm, is sufficient.

Also the quantity of the above described both fine particles can not be generally limited, as above described. But, 0.1 to 60 wt %, preferably 1.0 to 40 wt %, based on coated polyethylenic resins is suitable.

In the case where the charging coefficient of carriers is small to an extent of 90 wt % and the coating layer is comparatively thick, a problem occurs in that the reproducibility is reduced when the continuous copying of fine lines is conducted by the use of such the carriers but such the problem can be solved by adding the above described additives.

The method of producing carriers according to the present invention is not specially limited and the known methods may be used but, for example, the method disclosed in Japanese Patent Laid-Open No. Sho 60-106808 is suitable. Said publication is herein cited as a part of the specification of the present invention. That is to say, the polyethylene-coated layer is formed by polymerizing ethylene on said carrier core material by the use of a product by a previous contact treatment of 1) a highly active catalyst ingredient containing titanium and/or zirconium and soluble to hydrocarbon solvents and 2) a carrier core material, and 3) organic aluminum compounds. In the case where the fine particles having a charge controlling function and the electrically conductive fine particles are added, it is sufficient to add them in the above described formation of the polyethylenic resin-coated layer.

In this method of forming polyethylene, the polyethylene-coated layer is directly formed by polymerization on the surface of the carrier core material, so that the strength and the durability of the obtained film are improved. In particular, when a weight average molecular weight of polyethylene is $5.0\times10^3$ to $5.0\times10^5$, preferably $1.0\times10^4$ to $4.5\times10^5$, still more preferably $5.0\times10^4$ to $4.0\times10^5$, the polyethylenic resin layer superior in strength and adhesion to carrier core material can be obtained.

If the weight average molecular weight is less than $5\times10^3$, irregularities are not formed on the surface of the carrier core materials, and strength of the coating layer become weak. If the weight average molecular weight is more than $5\times10^5$, the adhesivity of polyethylene to the core material become low, and the durability of carriers also become low.

In order to improve the adhesion of the polyethylenic resin layer to the carrier core material, it is effective to conduct the polymerization under the condition such that the molecular weight is reduced in the first stage of the polymerization.

According to the present invention, other olefinic resins, for example polypropylene, also can be used so far as the coating film formed on the surface of the carriers meets the conditions, such as uneven structure, coating coefficient, charging coefficient and electric resistane, similar to those of the above described polyethylenic resincoated layer on the surface of the carriers.

The carriers according to the present invention are mixed with the known toners to be used as a binary developer.

PRODUCTION EXAMPLE 1 of Carriers

(1) Preparation of a Titanium-containing Catalyst Ingredient

N-heptane, which has been dehydrated at room temperature, of 200 ml and magnesium stearate, which has been dehydrated at 120° C. under vacuum (2 mmHg), of 15 g (25 mmol) were put in a flask having an inside capacity of 500 ml replaced with argon to be turned into a slurry. Titanium tetrachloride of 0.44 g (2.3 mmol) was added drop by drop to the resulting slurry with stirring and then the resulting mixture was begun to heat and subjected to a reaction for one hour with refluxing, whereby obtaining a viscous and transparent solution of a titanium-containing catalyst ingredient.

(2) Evaluation of the Activity of the titanium-containing Catalyst Ingredient Dehydrated hexane of 400 ml, triethyl aluminum of 0.8 mmol, diethyl aluminum chloride of 0.8 mmol and the titanium-containing catalyst ingredient, which had been obtained in the above described (1), of 0.004 mmol in titanium atoms were put in an auto clave having an inside capacity of 1 l replaced with argon and heated to 90° C. In this time, a pressure within a system amounted to 1.5 kg/cm²G. Then, hydrogen was supplied to increase the pressure to 5.5 kg/cm²G and ethylene was continuously supplied so that a total pressure might be kept at 9.5 kg/cm²G, followed by polymerizing for one hour to obtain a polymer of 70 g. The polymerization activity was 365 kg/g.Ti/Hr and the MFR (the molten fluidity at 190° C. under a load of 2.16 kg; JIS K 7210) of the obtained polymer was 40.

(3) Reaction of the titanium-containing Catalyst Ingredient with Fillers and Polymerization of Ethylene.

Hexane, which had been dehydrated at room temperature, of 500 ml and sintered ferrite powders F-300H (having a mean particle diameter of 60 μm manufactured by Nihon Teppun Co., Ltd.), which had been dried for 3 hours at 200° C. under vacuum (2 mmHg), of 450 g were put in an auto clave having an inside capacity of 1 l replaced with argon and the stirring was started. Then, 0.02 mmol in titanium atoms of the titanium-containing polymerization catalyst ingredient obtained according to (1) above mentioned was added and the resulting mixture was subjected to a reaction about 1 hour. Subsequently, triethyl aluminum of 2.0 mmol and diethyl aluminum chloride of 2.0 mmol were added and the resulting mixture was heated to 90° C. In this time, a pressure within a system amounted to 1.5 $kg/cm^2G$. Then, hydrogen was supplied to increase the pressure until 2 $kg/cm^2G$ followed by conducting the polymerization for 40 minutes with continuously supplying ethylene so that the total pressure might be kept at 6 $kg/cm^2G$ to obtain a ferrite-containing polyethylene composite of 473 g in all. The dried powders exhibited a uniform grayish white color and it was found by the electron microscopic observation that a surface of ferrite was thinly coated with polyethylene and no cohesion of ferrite particles among themselves was observed in polyethylene.

In addition, this composite was measured by means of a TGA (thermal balance) with the result that ferrite was contained in a quantity of 95.2 wt %.

PRODUCTION EXAMPLE 2 of carriers

Carriers were produced in the same manner as in PRODUCTION EXAMPLE 1 excepting that ethylene was polymerized under the conditions shown in Table 1 and triethyl aluminum and diethyl aluminum chloride was used in a quantity of 1 mmol, respectively.

PRODUCTION EXAMPLE 3 of carriers

Carriers were produced in the same manner as in PRODUCTION EXAMPLE 1 excepting that ethylene was polymerized under the conditions shown in Table 1.

The conditions and results in PRODUCTION EXAMPLES 1 to 3 were collected in the following Table 1.

until 2 $kg/cm^2G$ and ethylene was continuously supplied so that the total pressure might be kept at 6 $kg/cm^2G$ to conduct the polymerization for 58 minutes, whereby obtaining a ferrite and molybdenum trioxide-containing polyethylene composite of 472 g in all. The dried powders exhibited a uniform gray color and it was observed by an electron microscope that a surface of the ferrite is thinly coated with polyethylene and molybdenum trioxide is uniformly dispersed in polyethylene. In addition, this composite was measured by means of a TGA (thermal balance) with the results that ferrite and molybdenum trioxide were contained in a quantity of 95.8 wt % in all and a ratio by weight of ferrite, polyethylene and molybdenum trioxide was 22.5:1:0.1 as calculated from charged quantities.

PRODUCTION EXAMPLE 5 of carriers

Ferrite of 450 g and the titanium-containing catalyst ingredient, which had been prepared in a manner similar to (1) of PRODUCTION EXAMPLE 1, of 0.02 mmol in titanium atoms were put in an auto clave having an inside capacity of 1 l replaced with argon and the resulting mixture was subjected to a reaction for one hour in the same manner as PRODUCTION EXAMPLE 4. Subsequently, carbon black (Ketchen black EC manufactured by Lion Akuzo Corporation) of 0.22 g was added to the reaction mixture through an upper nozzle of the auto clave. Carbon black, which had been dried for one hour at 200° C. under vacuum and turned into a slurry by the use of dehydrated hexane, was used. Subsequently, triethyl aluminum of 2.0 mmol and diethyl aluminum chloride of 2.0 mmol were added to the reaction mixture and the resulting mixture was heated

TABLE 1

| | Quantity of ferrite charged (g) | Quantity of catalyst [Ti] [mmol] | Polymerization conditions: Time (min) | Temperature (°C.) | Pressure ethylene/hydrogen ($kg/cm^2$ G) | Yield (g) |
|---|---|---|---|---|---|---|
| PRODUCTION EXAMPLE 1 | 450 | 0.02 | 40 | 90 | 4/0.5 | 473 |
| PRODUCTION EXAMPLE 2 | 450 | 0.005 | 35 | 90 | 2/1 | 452 |
| PRODUCTION EXAMPLE 3 | 450 | 0.02 | 51 | 90 | 6/3 | 500 |

PRODUCTION EXAMPLE 4 of carriers

Hexane, which had been dehydrated at room temperature, of 500 ml and sintered ferrite powders F-300H (having a mean particle diameter of 60 μm manufactured by Nihon Teppun Co., Ltd.), which had been dried for 3 hours at 200° C. under vacuum (2 mmHg), of 450 g were put in an auto clave having an inside capacity replaced with argon and the stirring was started. Then, the mixture was heated to 40° C. and the titanium-containing catalyst ingredient, which had been obtained in the above described (1) of PRODUCTION EXAMPLE 1, of 0.02 mmol in titanium atoms was added to the mixture followed by the reaction about one hour. Subsequently, molybdenum trioxide (having a mean particle diameter of about 0.4 μm manufactured by Shinnihon Kinzoku Co., Ltd.) of 2.0 g was put in the reaction mixture through an upper nozzle of the auto clave. In addition, molybdenum trioxide, which had dried for one hour at 200° C. under vacuum and turned into a slurry by the use of dehydrated hexane, was used. Subsequently, triethyl aluminum of 2.0 mmol and diethyl aluminum chloride of 2.0 mmol were added and the resulting mixture was heated to 90° C. In this time, a pressure within the system amounted to 1.5 $kg/cm^2G$. Then, hydrogen was supplied to increase the pressure to 90° C. In this time, a pressure within a system amounted to 1.5 $kg/cm^2G$. Then hydrogen was supplied to increase the pressure until 2 $kg/cm^2G$ followed by conducting the polymerization for 45 minutes with continuously supplying ethylene so that the total pressure might be kept at 6 $kg/cm^2G$ to obtain a ferrite and carbon black-containing polyethylene composite of 472 g in all. The dried powders exhibited a uniform black color and it was observed by an electron microscope that a surface of ferrite was thinly coated with polyethylene and carbon black was uniformly dispersed in polyethylene. In addition, this composite was measured by a TGA (thermal balance) with the results that ferrite was contained in a quantity of 95.3 wt % and a ratio by weight of ferrite, polyethylene and carbon black was 21:1:0.01 as calculated from charged quantities.

The conditions and results are shown in Table 2.

PRODUCTION EXAMPLE 6 of carriers

The polymerization was conducted in the same manner as in PRODUCTION EXAMPLE 5 excepting that carbon black was used in a quantity as shown in Table 2. The conditions and results are shown in Table 2.

PRODUCTION EXAMPLE 7 of carriers

Dehydrated hexane of 500 ml and ferrite of 450 g were put in an auto clave having an inside capacity of 1 l replaced with argon in the same manner as in PRODUCTION EXAMPLE 4. Then, diethyl aluminum chloride of 1 mmol was added to the resulting mixture with stirring and the resulting mixture was subjected to a reaction for 30 minutes at 40° C. followed by adding the titanium-containing catalyst ingredient, which had been prepared in (1) of PRODUCTION EXAMPLE 1, of 0.02 mmol in titanium atoms and conducting a reaction for 1 hour. Subsequently, magnetite RB-BL fine particles (manufactured by Titan Kogyo Co., Ltd.), which had been dried for 3 hours at 200° C. under vacuum, of 7.5 g and triethyl aluminum of 2.0 mmol were added to the reaction mixture and the resulting mixture was heated to 90° C. In this time, a pressure within a system amounted to 1.5 $kg/cm^2G$. Subsequently, hydrogen was supplied to increase the pressure until 1.7 $kg/cm^2G$ followed by conducting the polymerization for 58 minutes with continuously supplying ethylene so that the total pressure might be kept at 3.2 $kg/cm^2G$ to obtain a composite of 495 g in all. No isolated magnetite fine powder was observed in the dried composite powders and it was confirmed by the electron microscopic observation also that magnetite fine powders were uniformly dispersed in polyethylene on a surface of ferrite (60 μm). In addition, this composite was measured by a TGA (thermal balance) with the results that a total content of ferrite and magnetite amounted to 92.4 wt % and a ratio by weight of ferrite (60 μm), polyethylene and magnetite fine powders was 12:1:0.2 as calculated from charged quantities.

The conditions and results are shown in Table 2.

PRODUCTION EXAMPLE 8 of carriers

The polymerization was conducted in the same manner as in PRODUCTION EXAMPLE 7 excepting that magnetite fine powders RB-BL (manufactured by Titan Kogyo Co., Ltd.) of 6.6 g were added.

The conditions and results are shown in Table 2.

PRODUCTION EXAMPLES 9 to 11 of carriers

The polymerization was conducted in the same manner as in PRODUCTION EXAMPLE 5 excepting that silicon carbide (manufactured by Ibiden Co., Ltd.) of 11.7 g, zinc oxide (23-K manufactured by Sakai Chemical Industries Co., Ltd.) of 11.1 g and electrically conductive titanium oxide (manufactured by Mitsubishi Metal Co., Ltd.) of 14.3 g was added in place of carbon black, respectively.

The conditions and results are shown in Table 2.

PRODUCTION EXAMPLE 12 of carriers

Ferrite of 450 g and the titanium-containing catalyst ingredient prepared according to (1) of PRODUCTION EXAMPLE 1 of 0.01 mmol in titanium atoms were put in an auto clave having an inside capacity of 1 l replaced with argon and the mixture was subjected to a reaction for one hour in the same manner as in PRODUCTION EXAMPLE 4. Subsequently, carbon black (Ketchen black EC manufactured by Lion Aguzo Corporation) of 0.46 g was put in the auto clave through an upper nozzle of the auto clave. In addition, carbon black, which had been dried for 1 hour at 200° C. under vacuum and turned into a slurry by the use of dehydrated hexane, was used. Then, triethyl aluminum of 1.0 mmol and diethyl aluminum chloride of 1.0 mmol were added to the resulting slurry and the resulting mixture was heated to 90° C. In this time, a pressure within a system amounted to 1.5 $kg/cm^2G$. Subsequently, 1-butene of 37.5 mmol (2.1 g) was introduced into the auto clave and then the pressure was increased until 2 $kg/cm^2G$ followed by conducting the polymerization for 33 minutes with continuously supplying ethylene so that the total pressure might be kept at 6 $kg/cm^2G$ to obtain a ferrite and carbon black-containing polyethylenic composite of 469 g in all. The dried powders exhibited a uniform black color and it was observed by an electron microscope that a surface of ferrite was thinly coated with the polymer and carbon black was uniformly dispersed in the polymer. In addition, this composite was measured by means of a TGA (thermal balance) with the result that a ratio by weight of ferrite, polymer and carbon black was 97:4:0.1 as calculated from charged quantities. In addition, the polymer, from which ferrite and carbon black had been removed, was obtained by the Soxley's extraction (solvent: xylene) and subjected to the infrared absorption analysis with the confirmation that the obtained composite was a polyethylenic copolymer containing butene in a quantity of 8 wt %.

PRODUCTION EXAMPLES 13, 14 of carriers

The polymerization was conducted in the same manner as in PRODUCTION EXAMPLE 5 excepting that stannous fluoride (manufactured by Morita Chemical Industries Co., Ltd.) of 1.1 g and silicon nitride (manufactured by Nihon Shin Kinzoku Co., Ltd.) of 5.2 g was added in place of carbon black, respectively.

The conditions and results are shown in Table 2.

PRODUCTION EXAMPLES 15 to 36 of carriers

Carriers were produced in the same manner as in PRODUCTION EXAMPLE 4 excepting that the following additives were added in place of molybdenum trioxide. The detailed production conditions are shown in Table 2.

In addition, manufacturers of the above described additives are as follows: molybdenum trioxide ($Mo0_3$): Nihon Shin Kinzoku Co., Ltd.; zinc oxide (ZnO): 23-K manufactured by Sakai Chemical Industries Co., Ltd.; ferrous fluoride ($FeF_2$): Morita Chemical Industries Co., Ltd.; stannous fluoride ($SnF_2$): Morita Chemical Industries Co., Ltd.; titanium nitride (TiN): Nihon Shin Kinzoku Co., Ltd.; titanium boride ($TiB_2$): Nihon Shin Kinzoku Co., Ltd.; silicon carbide (SiC): Showa Denko Co., Ltd.; acetylene black: Denki Kagaku Kogyo Co., Ltd.; magnetite powder RB-BL: Titan Kogyo Co., Ltd.; titanium dioxide ($TiO_2$): R-830; Ishihara Sangyo Co., Ltd.; magesium oxide (MgO): 500-1W; Asahi Glass Co., Ltd.; magnesium fluoride ($MgF_2$): Morita Chemical Industries Co., Ltd.; silicon nitride ($Si_3N_4$): Nihon Shin Kinzoku Co., Ltd.; zirconium boride ($ZrB_2$): Nihon Shin Kinzoku Co., Ltd.; tungsten carbide (WC): Nihon Shin Kinzoku Co., Ltd.; Ketchen black EC: Lion Akuzo Corporation; ferrite powder MFP-2; TDK Co, Ltd.

PRODUCTION EXAMPLE 37 of carriers

Ferrite of 450 g and the titanium-containing catalyst ingredient, which had been prepared according to (1) of PRODUCTION EXAMPLE 1, of 0.01 mmol in titanium atoms were put in an auto clave having an inside capacity of 1 l replaced with argon and the resulting mixture was subjected to a reaction for 1 hour in the same manner as in PRODUCTION EXAMPLE 4. Then, carbon black (Ketchen black EC manufactured by Lion Akuzo Corporation) of 0.50 g was put in the auto clave through an upper nozzle of the auto clave. In addition, carbon black, which had been dried for 1 hour at 200° C. under vacuum and turned into a slurry by the use of dehydrated hexane, was used. Subsequently, triethyl aluminum of 1.0 mmol and diethyl aluminum chloride of 1.0 mmol were added to the resulting slurry and the resulting mixture was heated to 90° C. In this time, a pressure within a system amounted to 1.5 $kg/cm^2G$. Then, 1-butene of 37.5 mmol (2.1 g) was introduced and hydrogen was supplied to increase the pressure until 2 $kg/cm^2G$ followed by conducting the polymerization for 28 minutes with continuously supplying ethylene so that the total pressure might be kept at 6 $kg/cm^2G$ to obtain a ferrite and carbon black-containing polyethylenic composite of 467 g in all. The dried powders exhibited a uniform black color and it was observed by means of an electron microscope that a surface of ferrite was thinly coated with the polymer and carbon black was uniformly dispersed in the polymer. In addition, this composite was measured by means of a TGA (thermal balance) with the result that a ratio by weight of ferrite, polymer and carbon black was 27:1:0.03. Furthermore, the polymer, from which ferrite and carbon black had been removed, was obtained by the Soxley's extraction (solvent: xylene) and subjected to the infrared absorption analysis with the confirmation that the obtained composite was a polyethylenic copolymer containing butene in a quantity of 8 wt. %.

PRODUCTION EXAMPLE 38 of carriers

Carriers were produced in the same manner as in PRODUCTION EXAMPLE 26 excepting that spherical iron powders (ST-60 having a mean particle diameter of 65 μm manufactured by Kanto Denka Kogyo Co., Ltd.) were used as the core material.

The conditions and results in PRODUCTION EXAMPLES 1 to 35 of carriers are shown in Table 2.

TABLE 2

| Production Example | Fillers: I*1) Charging quantity [g] | Fillers: Kind | Fillers: II Charging quantity [g] | Quantity of catalyst [Ti] [mmol] | Quantity of assistant catalyst [TEA/DEAC]*2) [mmol] | Polymerization pressure*3) $PC_2H_4/PH_2$ [Kg/cm$^2$] | Polymerization time [min] | Yield [g] | weight ratio (I:polyethylene:II) |
|---|---|---|---|---|---|---|---|---|---|
| 4 | 450 | molybdenum trioxide | 2.0 | 0.02 | 2/2 | 4/0.5 | 58 | 472 | 23:1:0.1 |
| 5 | 450 | Ketchen Black EC | 0.22 | 0.02 | 2/2 | 4/0.5 | 45 | 472 | 21:1:0.01 |
| 6 | 450 | Ketchen Black EC | 0.96 | 0.02 | 2/2 | 6/0.7 | 51 | 499 | 9:1:0.02 |
| 7 | 450 | magnetite corpuscles RB-BL | 7.5 | 0.02 | 2/1 | 2.5/0.2 | 58 | 495 | 12:1:0.20 |
| 8 | 450 | magnetite corpuscles RB-BL | 6.6 | 0.02 | 2/1 | 2.5/0.2 | 30 | 473 | 27:1:0.40 |
| 9 | 450 | silicon carbide | 11.7 | 0.02 | 2/2 | 4/0.5 | 65 | 491 | 15:1:0.40 |
| 10 | 450 | zinc oxide | 11.1 | 0.02 | 2/2 | 4/0.5 | 72 | 489 | 16:1:0.40 |
| 11 | 450 | conductive titanium oxide | 14.3 | 0.02 | 2/2 | 4/0.5 | 58 | 500 | 13:1:0.40 |
| 12 | 450 | Ketchen Black EC | 0.46 | 0.01 | 1/1 | 4/0.5*4) | 33 | 469 | 24:1:0.025 |
| 13 | 450 | stannous fluoride | 1.1 | 0.02 | 2/2 | 4/0.5 | 35 | 474 | 20:1:0.05 |
| 14 | 450 | silicon nitride | 5.2 | 0.02 | 2/2 | 4/0.5 | 37 | 470 | 30:1:0.35 |
| 15 | 450 | titanium dioxide + | 0.92 | 0.01 | 1/1 | 4/0.1 | 38 | 460 | 50:1:0.12 |
| | | Ketchen Black EC | 0.18 | | | | | | |
| 16 | 450 | zinc oxide | 12.3 | 0.02 | 2/2 | 4/0.8 | 66 | 493 | 15:1:0.40 |
| 17 | 450 | magnesium oxide | 11.5 | 0.02 | 2/2 | 4/0.5 | 50 | 500 | 12:1:0.30 |
| 18 | 450 | ferrous fluoride | 1.4 | 0.01 | 1/1 | 2/2 | 15 | 454 | 165:1:0.50 |
| 19 | 450 | magnesium fluoride + | 3.8 | 0.02 | 2/2 | 4/0.1 | 40 | 474 | 23:1:0.23 |
| | | acetylene black | 0.6 | | | | | | |
| 20 | 450 | stannous fluoride | 0.39 | 0.01 | 1/1 | 4/0.1 | 45 | 458 | 57:1:0.05 |
| 21 | 450 | strontium | 0.13 | 0.01 | 1/1 | 3/2 | 13 | 453 | 174:1:0.05 |
| | | fluoride | | | | | 38 | 460 | 50:1:0.12 |
| 22 | 450 | Ketchen Black EC | 0.16 | 0.01 | 1/1 | 2/1 | 50 | 466 | 29:1:0.01 |
| 23 | 450 | Ketchen Black EC | 0.63 | 0.02 | 2/2 | 4/0.5 | 42 | 472 | 21:1:0.03 |
| 24 | 450 | Ketchen Black EC | 1.2 | 0.02 | 2/2 | 4/0.5 | 53 | 475 | 19:1:0.05 |
| 25 | 450 | acetylene black | 0.005 | 0.02 | 2/2 | 4/0.1 | 25 | 455 | 99:1:0.001 |
| 26 | 450 | acetylene black | 1.3 | 0.01 | 1/1 | 4/0.7 | 66 | 496 | 10:1:0.03 |
| 27 | 450 | ferrite corpuscle MFP-2 | 14.0 | 0.02 | 2/2 | 4/4 | 78 | 499 | 13:1:0.40 |
| 28 | 450 | ferrite corpuscle MFP-2 | 3.7 | 0.01 | 1/1 | 4/0.5 | 85 | 472 | 24:1:0.20 |
| 29 | 450 | magnetite corpuscle RB-BL | 3.6 | 0.01 | 1/1 | 4/0.1 | 72 | 472 | 25:1:0.20 |
| 30 | 450 | magnetite corpuscle RB-BL | 5.9 | 0.01 | 1/1 | 4/0.3 | 60 | 471 | 30:1:0.40 |
| 31 | 450 | silicon nitride | 2.1 | 0.01 | 1/1 | 4/1 | 42 | 458 | 74:1:0.35 |
| 32 | 450 | titanium nitride | 3.9 | 0.02 | 2/2 | 4/0.5 | 50 | 474 | 23:1:0.20 |
| 33 | 450 | titanium nitride | 0.82 | 0.01 | 1/1 | 4/4 | 18 | 454 | 138:1:0.25 |
| 34 | 450 | zirconium boride | 7.8 | 0.02 | 2/2 | 4/0.2 | 48 | 489 | 14:1:0.25 |
| 35 | 450 | tungsten carbide | 0.63 | 0.01 | 1/1 | 3/2 | 16 | 453 | 215:1:0.30 |
| 36 | 450 | silicon carbide | 0.84 | 0.01 | 1/1 | 4/0.2 | 12 | 454 | 161:1:0.30 |
| 37 | 450 | Ketchen Black EC | 0.50 | 0.01 | 1/1 | 4/0.5*4) | 28 | 467 | 27:1:0.03 |
| 38 | 450 | acetylene black | 1.4 | 0.02 | 2/2 | 4/0.8 | 73 | 497 | 10:1:0.03 |

*1) Filler I is sintered ferrite (having a mean particle diameter of 60 m).
*2) TEA and DEAC is triethyl aluminium and diethyl aluminum chloride, respectively.
*3) Partial pressures of ethylene and hydrogen when they are polymerized.
*4) 1-butene of 37.5 mmol (2.1 g) is added in the system (copolymerized with ethylene).

S values, filling ratio with ferrite (wt %) (filling ratio with iron powders in PRODUCTION EXAMPLE 38), specific gravities, weight average molecular weight (Mw) of the polyethylene resin layer, electric resistance (ohm.cm) and coating ratio (%) of the carriers obtained according to PRODUCTION EXAMPLES 1 to 38 are shown in the following Table 3.

In addition, the filling ratio with ferrite (wt %) was calculated from a ratio by weight of ferrite obtained by the TGA.

The specific gravity was measured in the following procedures by the use of a measuring apparatus provided with an electronic balance: the sensitivity is 0.1 mg;

a pycnometer: a specific-gravity bottle having an inside capacity of 50 ml provided with a Gahlsack thermometer provided in JIS R 3501 (glass wares for use in the analytical chemistry); and a constant temperature bath: a water temperature can be kept at 23±0.5°C.

1) A weight of a pycnometer, which has been previously dried, is accurately measured until a figure of 0.1 mg.

2) The pycnometer is filled with n-heptane, which has been sufficiently degased, and held in the constant temperature bath of 23±0.5° C. followed by accurately setting a surface of a liquid to a gauge line. The pycnometer is taken out of the constant temperature bath and water stuck to an outside of the pycnometer is completely wiped off followed by accurately measuring a weight of the pycnometer with n-heptane therein until a figure of 0.1 mg.

3) Subsequently, the pycnometer is emptied and then filled with a sample of 10 to 15 g followed by accurately measuring a weight of the pycnometer with the sample therein again to subtract the result in 1) from the obtained result, whereby determining the weight of the sample.

4) Degased n-heptane of 20 to 30 ml is gently put in the pycnometer with the sample therein to completely cover the sample with n-heptane followed by gently removing air from the liquid in a vacuum desiccator.

5) Then, the pycnometer is filled with degased n-heptane until the vicinity of the gauge line and held in the constant temperature bath of 23°±0.5° C. for 1 hour. After the surface of the liquid was accurately set to the gauge line, the pycnometer is taken out of the constant temperature bath and water stuck to the outside of the pycnometer is completely wiped off followed by accurately measuring a weight of the pycnometer with the sample and n-heptane therein until a figure of 0.1 mg.

6) The specific gravity is calculated by the following equation:

$$S=a\cdot d/(b-c+a)$$

wherein

S: specific gravity;

a: weight of the sample (g);

b: weight (g) of the pycnometer with an immersion liquid filled until the gauge line thereof;

c: weight (g) of the pycnometer containing the sample with the immersion liquid filled until the gauge line thereof; and d: specific gravity of the immersion liquid at 23° C.

The weight average molecular weight of the polyethylene resin-coated layer was determined by the gel-permeation chromatography (GPC) under the following conditions:

Measuring apparatus: ALC-GPC 150 C manufactured by Waters, Inc.

Column: Toso TSK HM+GMH×2

Solvent: trichlorobenzene

Temperature: 135° C.

Concentration: 5 mg/10 ml

Pouring quantity: 400 μl

Flow rate: 1 μl/min

The electric resistance was calculated in inherent bulk resistance ρ by placing the sample having a thickness of 1 mm and a diameter of 50 mm on a metallic circular electrode, placing an electrode having a weight of 895.4 g and a diameter of 20 mm and a gird electrode having an inside diameter of 38 mm and an outside diameter of 42 mm on said sample, and reading a value of an electric current after 1 minute from a point of time when the application of a direct current voltage of 500 V was started. The measurements were repeated 5 times under the environment that a temperature was 25°±1° C. and a relative humidity was 55±5% and their mean value was adopted.

In the present invention, the coating ratio of carriers is a mean value of values measured by means of an image analyzer (Ruzex 5000 manufactured by Nippon Regulator Co., Ltd.) but in general no great difference is observed in the measurement of the coating ratio even though measuring apparatus used are different in kind, so that the measuring apparatus is not specially limited by the above described one. That is to say, a carrier image obtained by a reflection type electron microscope was taken in the image analyzer to measure an area of portions covered with the coating layer of the core material and adopt a ratio of said area to the total area of projected image of the particle as the coating ratio.

There has been used also a method in which a carrier particle to be observed and portions covered with the coating layer of the core material of said carrier particle are reproduced on a tracing paper and the like from a photograph taken by means of a reflection type electron microscope and the respective portions are cut off to be weighed followed by calculating the coating ratio from a ratio of a weight of the tracing paper and the like representing the portions covered with the coating layer to a weight of those representing the whole carrier particle.

TABLE 3

| Production Example No. | Filling ratio (wt %) | S value | Specific gravity of carriers | Mw (GPC value) of resin layer | Additives (addition coefficient wt %) | Electric resistance (ohm · cm) | Coating ratio (%) |
|---|---|---|---|---|---|---|---|
| 1 | 95.2 | 141 | 4.30 | $1.5 \times 10^5$ | none | $6.7 \times 10^{13}$ | 70 |
| 2 | 99.5 | 132 | 5.13 | $5.3 \times 10^4$ | none | $2.3 \times 10^{11}$ | 100 |
| 3 | 90.0 | 197 | 3.61 | $6.4 \times 10^4$ | none | $1.0 \times 10^{14}$ | 100 |
| 4 | 95.4 | 143 | 4.32 | $1.6 \times 10^5$ | molybdenum trioxide (10) | $5.2 \times 10^{13}$ | 100 |
| 5 | 95.3 | 161 | 4.27 | $2.5 \times 10^5$ | carbon black (1.0) | $4.5 \times 10^{13}$ | 100 |
| 6 | 90.2 | 146 | 3.64 | $3.2 \times 10^{15}$ | carbon black (2.0) | $6.1 \times 10^{12}$ | 100 |
| 7 | 91.0 | 140 | 3.88 | $2.2 \times 10^5$ | magnetite corpuscle (20.0) | $1.7 \times 10^{10}$ | 100 |
| 8 | 95.1 | 130 | 4.49 | $1.9 \times 10^5$ | magnetite corpuscle (40.0) | $2.1 \times 10^9$ | 100 |
| 9 | 91.6 | 139 | 4.11 | $3.3 \times 10^5$ | silicon carbide (40.0) | $1.0 \times 10^9$ | 93 |

TABLE 3-continued

| Production Example No. | Filling ratio (wt %) | S value | Specific gravity of carriers | Mw (GPC value) of resin layer | Additives (addition coefficient wt %) | Electric resistance (ohm · cm) | Coating ratio (%) |
|---|---|---|---|---|---|---|---|
| 10 | 92.0 | 128 | 4.30 | $2.9 \times 10^5$ | conductive zinc oxide (40.0) | $6.2 \times 10^7$ | 88 |
| 11 | 90.0 | 149 | 4.02 | $2.9 \times 10^5$ | conductive titanium oxide (40.0) | $2.2 \times 10^7$ | 100 |
| 12 | 95.9 | 134 | 4.38 | $2.7 \times 10^5$ | carbon black (2.5) | $8.1 \times 10^{10}$ | 100 |
| 13 | 95.0 | 137 | 4.29 | $2.4 \times 10^5$ | stannous fluoride (5.0) | $5.0 \times 10^{11}$ | 100 |
| 14 | 95.7 | 145 | 4.60 | $2.1 \times 10^5$ | silicon nitride (35.0) | $7.4 \times 10^{12}$ | 98 |
| 15 | 97.8 | 187 | 4.75 | $4.5 \times 10^5$ | titanium dioxide (10) Ketchen Black EC (2) | $4.1 \times 10^{10}$ | 75 |
| 16 | 91.3 | 201 | 4.23 | $8.9 \times 10^4$ | zinc oxide (40) | $2.2 \times 10^{12}$ | 89 |
| 17 | 90.0 | 192 | 3.94 | $1.5 \times 10^5$ | magnesium oxide (30) | $6.5 \times 10^{13}$ | 82 |
| 18 | 99.1 | 155 | 5.08 | $9.9 \times 10^3$ | ferrous fluoride (50) | $9.7 \times 10^{12}$ | 100 |
| 19 | 95.0 | 173 | 4.40 | $4.3 \times 10^5$ | magnesium fluoride (20) acetylene black (3) | $1.0 \times 10^8$ | 100 |
| 20 | 98.2 | 195 | 4.95 | $3.7 \times 10^5$ | stannous fluoride (5) | $2.8 \times 10^{11}$ | 72 |
| 21 | 99.4 | 132 | 5.05 | $2.5 \times 10^4$ | strontium fluoride (5) | $7.4 \times 10^{13}$ | 96 |
| 22 | 96.6 | 148 | 4.53 | $7.2 \times 10^4$ | Ketchen Black EC (1) | $4.5 \times 10^9$ | 100 |
| 23 | 95.4 | 133 | 4.29 | $1.7 \times 10^5$ | Ketchen Black EC (3) | $3.0 \times 10^7$ | 97 |
| 24 | 94.7 | 152 | 4.24 | $2.2 \times 10^5$ | Ketchen Black EC (5) | $1.2 \times 10^6$ | 100 |
| 25 | 99.0 | 140 | 4.96 | $3.9 \times 10^5$ | acetylene black (0.1) | $8.0 \times 10^{13}$ | 100 |
| 26 | 90.8 | 177 | 3.73 | $9.2 \times 10^4$ | acetylene black (3) | $9.4 \times 10^6$ | 100 |
| 27 | 90.2 | 166 | 4.14 | $1.4 \times 10^4$ | ferrite MFP-2 (40) | $3.7 \times 10^{11}$ | 98 |
| 28 | 95.3 | 135 | 4.30 | $1.8 \times 10^5$ | ferrite MFP-2 (20) | $2.2 \times 10^{12}$ | 100 |
| 29 | 95.4 | 171 | 4.28 | $5.0 \times 10^5$ | magnetite RB-BL (20) | $1.7 \times 10^{10}$ | 93 |
| 30 | 95.6 | 137 | 4.31 | $2.1 \times 10^5$ | magnetite RB-BL (40) | $2.1 \times 10^9$ | 100 |
| 31 | 98.2 | 150 | 4.89 | $9.6 \times 10^4$ | silicon nitride (35) | $7.2 \times 10^6$ | 89 |
| 32 | 95.0 | 142 | 4.41 | $1.7 \times 10^5$ | titanium nitride (20) | $5.5 \times 10^7$ | 100 |
| 33 | 99.1 | 202 | — | $2.4 \times 10^4$ | titanium boride (25) | $8.6 \times 10^8$ | 100 |
| 34 | 92.0 | 188 | — | $3.0 \times 10^5$ | zirconium boride (25) | $2.9 \times 10^7$ | 100 |
| 35 | 99.4 | 169 | 5.11 | $1.9 \times 10^4$ | tungsten carbide (30) | $1.8 \times 10^6$ | 100 |
| 36 | 99.2 | 163 | 5.07 | $3.1 \times 10^5$ | silicon carbide (30) | $3.6 \times 10^6$ | 100 |
| 37 | 69.3 | 134 | 4.48 | $2.4 \times 10^5$ | Ketchen Black EC (3) | $1.0 \times 10^8$ | 100 |
| 38 | 90.5 | 136 | 4.60 | $9.7 \times 10^4$ | acetylene black (3) | $4.1 \times 10^9$ | 100 |

PRODUCTION EXAMPLE 1 of toners [(−) chargeable toner (toner A)]

| Ingredient | Parts by weight |
|---|---|
| Polyester resin (softening point: 130° C.; glass transition point: 60° C.; AV: 25; OHV: 38) | 100 |
| Carbon black (MA#8 manufactured by Mitsubishi Kasei Co., Ltd) | 5 |
| Dyestuff (Spilon Black TRH manufactured by Hodogaya Kagaku Co., Ltd.) | 3 |

The above described materials were sufficiently mixed in a ball mill and then kneaded by the use of a three-roll mill heated at 140° C. The kneaded product was left as it was to be cooled and roughly pulverized in a feather mill followed by finely pulverizing in a jet mill. Subsequently, the resulting fine particles were pneumatically classified to obtain fine particles having a mean particle diameter of 13 μm (toner A).

PRODUCTION EXAMPLE 2 of toners [(+) chargeable toner (toner B)]

Toner B was produced from the following materials in the same manner as in PRODUCTION EXAMPLE 1.

| Ingredient | Parts by weight |
|---|---|
| Styrene-n-butyl methacrylate resin (softening point: 132° C.; glass transition point: 60° C.) | 100 |
| Carbon black (MA#8, manufactured by (Mitsubishi Kasei Co., Ltd) | 5 |
| Nigrosine dyestuff (Bontron N-01 manufactured by | 3 |

-continued

| Ingredient | Parts by weight |
|---|---|
| Orient Kagaku Co., Ltd.) | |

EXAMPLE 1

The carriers obtained according to PRODUCTION EXAMPLE 1 of carriers were mixed with the toner A to obtain a developer containing toners in a quantity of 7 wt %. In this time, the charging quantity of the toners was −12.7 μC/g.

Subsequently, this developer was tested. EP-570Z (manufactured by Minolta Camera Co., Ltd.) was used as a copying machine. Both the charging quantity of the toners and the image concentration did not exhibit any great change during the repeated 500,000 times of copying, that is they were stable. The quantity of spent toners was measured at the respective points of time when the copying had been repeated 100,000 times, 300,000 times and 500,000 times and also the reproducibility of fine lines was evaluated. The quantity of spent toners is measured by a method in which the sampled developer is divided into the toners and the carriers by the blow off method, the divided carriers of about 1.00 g being immersed in ethanol of 20 ml for 2 hours, the resulting mixture being filtrated, and the absorption coefficient of the filtrate at 500 nm being measured by means of a spectrophotometer. In addition, the quantity of the dyestuff eluted from the toners is calculated from the absorption coefficient at 500 nm on the basis of the calibration curve for the dyestuff ingredient contained in the toners. The quantity of spent toners (mg/carrier 1 g) is determined as a quantity of toners fixedly stuck to the carrier from a ratio of this value to the quantity of the dyestuff contained in the toner.

However, the quantity of spent toners determined in the above described manner was almost 0.0 mg/carrier 1 g or shifted from the range of the calibration curve, whereby exhibiting a negative value. After all, it is exhibited that these carriers did not bring about spent toners. In addition, the existence of spent toners are collected in Table 4.

The reproducibility of fine lines was evaluated for a black line having a line-width of 50 μm and a reflection concentration of 1.5 and ranked as follows:

Good: the orginal image is almost completely reproduced on the copied image.

Bad (slightly): the line-width is reduced and the line is partially missing.

Bad (remarkably): the line-width is remarkably reduced or the line is remarkably missing or hardly reproduced.

On the other hand, this developer was preserved for 24 hours under the high-temperature and high-humidity conditions that a temperature was 35° C. and a relative humidity was 85% and then its charging quantity of toners was measured with the result that it was −12.6 μC/g. This indicates that this carrier is superior in environmental resistance.

EXAMPLE 2 to 3

Developers were produced in the same manner as in Example 1 excepting that carriers and toners shown in Table 4 were used and evaluated. However, in the case where the toner B was used, EP-490Z (manufactured by Minolta Camera Co., Ltd.) was used as a copying machine for use in the copying test.

The results are shown in Table 4.

EXAMPLE 4

The carriers obtained according to PRODUCTION EXAMPLE 4 of carriers were mixed with the toner B to obtain a developer containing toners in a quantity of 7 wt %. In this time, the charging quantity of the toners was +18.4 μC/g.

Subsequently, this developer was tested. EP-490Z (manufactured by Minolta Camera Co., Ltd.) was used as a copying machine. Both the charging quantity of the toners and the image concentration did not exhibit any great change during the repeated 500,000 times of copying, that is they were stable. The quantity of spent toners was measured at the respective points of time when the copying had been repeated 100,000 times, 300,000 times and 500,000 times and also the reproducibility of fine lines was evaluated.

The results are shown in Table 4.

EXAMPLE 5 to 38

Developers were produced in the same manner as in Example 4 excepting that carriers and toners shown in Table 4 were used and evaluated. However, in the case where the toner A was used, EP-570Z (manufactured by Minolta Camera Co., Ltd.) was used as a copying machine for use in the copying test.

The results are shown in Table 4.

COMPARATIVE EXAMPLE 1

Thermosetting resin-coated carriers (acrylic resin-coated carriers F141-3040 having a mean particle diameter of 53.2 μm, the S value of 115 and a core material charging coefficient of 99.3 wt % manufactured by Nihon Teppun Co., Ltd.) were used as the carriers. These carriers were mixed with the toner A to obtain a developer containing the toners in a quantity of 7 wt %. In this time, the charging quantity of toners was −11.7 μC/g. In addition, the charging quantity of toners was remarkably reduced under the high-temperature and high-humidity condition.

Then, the same copying tests as those in Example 1 were conducted using this developer. The charging quantity of toners was reduced with an increase of a number of copying times. The quantity of spent toners was investigated at the respective points of time when the copying had been repeated 100,000 times, 300,000 times and 500,000 times with the results that the quantity of spent toners was gradually increased with an increase of a number of copying times, as shown in Table 4. This proves a cause of the reduction of the charging quantity of toners during the copying tests and indicates that this carrier is inferior in spent resistance. These results are shown in Table 4 together with the results of the environmental tests.

COMPARATIVE EXAMPLE 2

Low-density polyethylene (High Wax 220 P manufactured by Mitsui Petroleum Chemistries Co., Ltd.) was dissolved in heated toluene (2%-solution) and the resulting solution was coated on iron powder carriers (AT-50 having a mean particle diameter of 50 μm manufactured by Kanto Denka Kogyo Co., Ltd.) as core material by means of a Spila coater (manufactured by Okada Seiko Co., Ltd.) in a quantity of 1.0 wt. % based on the core material.

The S value of the carriers, which had been obtained in the above described manner, was 120, the core material-charging coefficient 99.0 wt. %, the electric resistance $1.4\times10^7$ ohm.cm, and the specific gravity 5.0. This carrier and the toner A were used to obtain a developer containing toners in a quantity of 7 wt. %. In this time, the charging quantity of toners was −18.2 μC/g.

Then, the same copying tests as those in Example 1 were conducted using this developer. The reproducibility of an image, in particular fine line portions (for example portions of 100 μm (concentration: 1.2), portions of 5 points (concentration: 0.9) and the like in the line chart), was reduced with an increase of a number of copying times during the copying tests. This is characteristic to uncoated carriers, so that this suggests the separation of the coated layer. In addition, it means the absence of spent toners or the separation of the coated layer that the quantity of spent toners is 0.0 g/l g carrier. These results are collectively shown in Table 4.

COMPARATIVE EXAMPLE 3

Carriers were obtained in the same manner as in Comparative Example 2 excepting that the resin was coated on the core material in a quantity of 5.0 wt. %.

The S value of the carrier, which had been obtained in the above described manner, was 124, the core material-charging coefficient 95.0 wt. %, the electric resistance $5.2\times10^{15}$ ohm.cm, and the specific gravity 4.6. This carrier and the toner B were used to obtain a developer containing toners in a quantity of 7 wt. %. In this time, the charging quantity of toners amounted to +26.8 μC/g but the reproducibility of fine lines in the copying tests was inferior in the same manner as in Comparative Example 1. Also these results were collected in Table 4.

COMPARATIVE EXAMPLE 4

Molybdenum trioxide (having a mean particle diameter of 0.4 μm manufactured by Shin Nippon Kinzoku Co., Ltd.) was added to an acrylic resin solution having a solid ratio of 2% (Acrydec A405 manufactured by Dainippon Ink Co., Ltd.) in a quantity of 3% based on solid portions and the former was sufficiently dispersed in the latter by ultrasonic waves to obtain a paint. Sintered ferrite powders (F-300H having a mean particle diameter of 60 μm manufactured by Nihon Teppun Co., Ltd.) were used as core materials. The paint was applied to the core materials in a quantity of 1.0 wt % based on the core materials by means of a spila coater (manufactured by Okada Seiki Co., Ltd.). Then a temperature within the system was increased until 150° C. to set the resin to obtain carriers coated with a thermosetting acrylic resin.

The S value of the carriers, which had been obtained in the above described manner, was 118, the core material-charging coefficient 99.2 wt %, the electric resistance $4.3\times10^{10}$ ohm.cm, and the specific gravity 5.07. This carrier and the toner B were used to obtain a developer containing toners in a quantity of 7 wt %. In this time, the charging quantity of toners amounted to +12.1 μC/g but was reduced with an increase of a number of copying times in the copying tests. In addition, it was confirmed that the toners were spent.

TABLE 4

| | Production Example of carriers | Kind of toners | Initial charging quantity [μC/g] | Charging quantity under the high-temperature and high-humidity conditions [μC/g] | Copying tests: Quantity of spent toners $1\times10^5$ | $3\times10^5$ | $5\times10^5$ | Reproducibility of fine lines $1\times10^5$ | $3\times10^5$ | $5\times10^5$ |
|---|---|---|---|---|---|---|---|---|---|---|
| Example No. | | | | | | | | | | |
| 1 | 1 | A | −14.7 | −14.6 | 0.00 | 0.00 | 0.00 | good | good | good |
| 2 | 2 | B | +10.2 | +10.2 | 0.00 | 0.00 | 0.00 | good | good | good |
| 3 | 3 | A | −11.4 | −11.5 | 0.00 | 0.02 | 0.00 | good | bad (slightly) | bad (slightly) |
| 4 | 4 | B | +18.4 | +18.1 | 0.00 | 0.00 | 0.00 | good | good | good |
| 5 | 5 | A | −8.4 | −8.3 | 0.00 | 0.00 | 0.02 | good | good | good |
| 6 | 6 | A | −8.2 | −8.2 | 0.00 | 0.00 | 0.00 | good | good | good |
| 7 | 7 | B | +17.6 | +17.4 | 0.00 | 0.00 | 0.00 | good | good | good |
| 8 | 8 | B | +16.7 | +16.7 | 0.00 | 0.01 | 0.01 | good | good | good |
| 9 | 9 | A | −17.2 | −17.0 | 0.00 | −0.01 | 0.00 | good | good | good |
| 10 | 10 | A | −17.3 | −17.4 | 0.00 | 0.00 | 0.03 | good | good | good |
| 11 | 11 | A | −14.8 | −14.8 | 0.00 | 0.00 | −0.02 | good | good | good |
| 12 | 12 | B | −8.1 | −8.0 | 0.00 | 0.00 | −0.01 | good | good | good |
| 13 | 13 | B | +17.5 | +17.2 | 0.00 | 0.00 | 0.00 | good | good | good |
| 14 | 14 | A | −17.0 | −16.8 | 0.00 | −0.01 | 0.00 | good | good | good |
| 15 | 15 | B | +13.1 | +13.0 | 0.00 | 0.00 | 0.01 | good | good | good |
| 16 | 16 | A | −17.3 | −17.0 | 0.00 | 0.00 | 0.00 | good | good | good |
| 17 | 17 | A | −18.6 | −18.6 | 0.00 | 0.00 | 0.00 | good | good | good |
| 18 | 18 | B | +17.2 | +17.2 | −0.00 | 0.00 | 0.00 | good | good | good |
| 19 | 19 | B | +12.9 | +12.7 | 0.00 | 0.00 | 0.01 | good | good | good |
| 20 | 20 | B | +16.8 | +16.9 | 0.00 | −0.00 | 0.00 | good | good | good |
| 21 | 21 | B | +15.8 | +15.5 | 0.00 | 0.00 | 0.00 | good | good | good |
| 22 | 22 | A | −9.2 | −9.1 | 0.00 | −0.02 | −0.01 | good | good | good |
| 23 | 23 | B | +10.5 | +10.3 | 0.00 | 0.00 | 0.00 | good | good | good |
| 24 | 24 | A | −11.0 | −10.8 | 0.00 | 0.00 | 0.02 | good | good | good |
| 25 | 25 | A | −15.6 | −15.5 | 0.00 | 0.00 | 0.00 | good | good | good |
| 26 | 26 | B | +13.0 | +12.7 | 0.01 | −0.01 | 0.03 | good | good | good |
| 27 | 27 | A | −14.2 | −14.4 | 0.00 | 0.00 | 0.00 | good | good | good |
| 28 | 28 | B | +12.2 | +12.2 | 0.00 | 0.00 | 0.00 | good | good | good |
| 29 | 29 | A | −15.3 | −15.1 | 0.00 | 0.01 | 0.01 | good | good | good |
| 30 | 30 | B | +16.8 | +16.7 | 0.00 | 0.00 | 0.00 | good | good | good |
| 31 | 31 | A | −16.2 | −15.8 | 0.00 | 0.00 | 0.03 | good | good | good |
| 32 | 32 | A | −16.9 | −17.0 | 0.00 | 0.00 | 0.00 | good | good | good |
| 33 | 33 | B | +14.0 | +14.2 | 0.00 | 0.00 | −0.02 | good | good | good |
| 34 | 34 | B | +15.5 | +15.4 | −0.01 | 0.00 | 0.00 | good | good | good |
| 35 | 35 | B | +16.3 | +16.0 | 0.00 | 0.00 | 0.00 | good | good | good |
| 36 | 36 | A | −15.8 | −15.6 | 0.00 | 0.02 | 0.00 | good | good | good |
| 37 | 37 | B | +8.3 | +8.3 | 0.00 | 0.00 | 0.00 | good | good | good |
| 38 | 38 | A | −11.6 | −11.5 | 0.00 | 0.00 | 0.00 | good | good | good |
| Comparative Example | | | | | | | | | | |
| 1 | — | A | −11.7 | −9.0 | 3.0 | 9.1 | 15.4 | good | good | good |
| 2 | — | A | −18.2 | −18.0 | 0.00 | 0.00 | 0.00 | good | bad (slightly) | bad (slightly) |
| 3 | — | B | +26.8 | +26.1 | 0.01 | 0.00 | 0.00 | bad (slightly) | bad (very) | bad (very) |
| 4 | — | B | +12.1 | +10.7 | 2.5 | 8.6 | 16.2 | good | good | good (slightly) |

What is claimed is:

1. A carrier used in a two-component developer of a magnetic brush developing method for the development of electrostatic latent images comprising:

a carrier core material of a spherical magnetic particle having a mean particle diameter of 20–100 μm and a coating layer comprising a polyolefinic resin formed by polymerizing an olefinic monomer on the surface of the carrier core material and having a convexo-concave surface which includes a plurality of fine convex portions;

and having a shape factor exhibiting the surface unevenness, which is expressed by the following formula, of 130 to 200:

$$S=\{(\text{outer circumference})^2/\text{area}\}\times\{1/(4\pi)\}\times 100$$

wherein the outer circumference is a mean value of outer circumferences of projected images of carrier particles and the area is a mean value of projected area of the carrier particles; and an outside shape of the carrier being a spherical shape;

70% or more of the surface of the carrier core material being coated with the coating layer, and the content of the carrier core material based on the carrier being 90% by weight or more.

2. A carrier of claim 1, wherein the carrier has the shape factor of 140 to 170.

3. A carrier of claim 1, wherein the carrier core material is coated by polyolefinic resin so that the content of the coated parts of the carrier is 90% or more.

4. A carrier of claim 1, wherein the content of the carrier core material based on the carrier being 95% by weight or more.

5. A carrier of claim 1, wherein the carrier is 3.5–7.5 in specific gravity.

6. A carrier of claim 1, wherein the coating layer includes at least one of fine particles having a charge controlling function and electrically conductive fine particles.

7. A carrier used in a two-component developer of a magnetic brush developing method for the development of electrostatic latent images comprising:

a carrier core material of a spherical magnetic particle having a mean particle diameter of 20–100 μm and a coating layer comprising a polyethylene resin of $5.0\times10^3$–$5.0\times10^5$ in weight average molecular weight formed by polymerizing an ethylene monomer on the surface of the carrier core material and having a convexo-concave surface which includes a plurality of fine convex portions;

and having a shape factor exhibiting the surface unevenness, which is expressed by the following formula of 130 to 200:

$$S=\{(\text{outer circumference})^2/\text{area}\}\times\{1/(4\pi)\}\times 100$$

wherein the outer circumference is a mean value of outer circumferences of projected images of carrier particles and the area is a mean value of projected area of the carrier particles; and an outside shape of the carrier being a spherical shape;

70% or more of the surface of the carrier core material being coated with the coating layer, and the content of the carrier core material based on the carrier being 90% by weight or more.

* * * * *

UNITED STATES PATENT AND TRADEMARK OFFICE

CERTIFICATE OF CORRECTION

PATENT NO. : 5,272,037

DATED : December 21, 1993

INVENTOR(S) : Junji OHTANI et al

It is certified that error appears in the above-indentified patent and that said Letters Patent is hereby corrected as shown below:

On title page, after item [73]

[*], delete "2007" and insert -- 2009 --.

Signed and Sealed this

Twenty-fourth Day of May, 1994

Attest:

BRUCE LEHMAN

Attesting Officer

Commissioner of Patents and Trademarks